United States Patent [19]

Nann et al.

[11] Patent Number: 4,657,799
[45] Date of Patent: Apr. 14, 1987

[54] SHEET MATERIAL FOR THE PRODUCTION OF SEPARATOR POCKETS FOR LEAD ACCUMULATORS

[75] Inventors: Eberhard Nann, Soest-Deiringsen; Walter Bernardi, Fuldatal, both of Fed. Rep. of Germany

[73] Assignee: Hagen Batterie AG, Soest, Fed. Rep. of Germany

[21] Appl. No.: 829,852

[22] Filed: Feb. 14, 1986

Related U.S. Application Data

[63] Continuation of Ser. No. 654,330, Sep. 25, 1984, abandoned.

[30] Foreign Application Priority Data

Sep. 28, 1983 [DE] Fed. Rep. of Germany ....... 3335547

[51] Int. Cl.$^4$ ................................................ B32B 3/14
[52] U.S. Cl. ........................................ 428/77; 428/78; 428/215
[58] Field of Search ...................... 428/77, 78, 35, 215

[56] References Cited

U.S. PATENT DOCUMENTS 3,179,535 4/1965 Comtois .............................. 428/78

FOREIGN PATENT DOCUMENTS 1540501 2/1979 United Kingdom .
2054947 6/1979 United Kingdom .

OTHER PUBLICATIONS

"Tomorrow's Technology Today", Evans Products Company, Battery Separator Division, pp. 1–8, no date.

Primary Examiner—Marion C. McCamish
Attorney, Agent, or Firm—Salter & Michaelson

[57] ABSTRACT

The invention relates to a thin sheet material which can be bonded for the production of separator pockets for lead accumulators in which, in particular, the positive plates of the lead accumulators provided with a web covering are jacketed. It is the objective to optimize the production of the separator pockets and the web covering of the plates and to obtain a better utilization of the positive mass. This objective is met by a web covering which is directly applied to the sheet material for the production of the separator pockets and has an area extension which is smaller than the inside area of the sheet material defined by the provided bonding seams of the separator pocket wherein the web covering preferably consists of an electrically conductive material.

4 Claims, 1 Drawing Figure

SHEET MATERIAL FOR THE PRODUCTION OF SEPARATOR POCKETS FOR LEAD ACCUMULATORS

This is a continuation of application Ser. No. 654,330 filed Sept. 25, 1984, now abandoned.

BACKGROUND AND SUMMARY OF THE INVENTION

The invention relates to a thin sheet material, which can be bonded, for the production of separator pockets for lead accumulators in which, in particular, the positive plates of the lead accumulators are provided with a jacket.

In the mass production of lead accumulators, the separator pockets are produced from a sheet material pulled from a roll, for example, a plastic foil which can be bonded and is cut to length, wrapped around the plates and is then bonded together at the side edges. These separator pockets are to prevent short-circuits between the positive and negative plates as a result of spilled or squeezed out active mass.

It is, moreover, known to additionally cover the plates over the entire area with a web or non-woven material to increase their cycle strength, in other words, to prevent the already mentioned spilling or squeezing out of active mass.

A combination of both measures in the mass production, for example, of starter batteries is not standard at this time because this would require a relatively high fabrication cost since the plates must first be provided with the web before, in a subsequent step, the sheet material for the production of the separator pockets can be wrapped around the plates with the web covering and bonded at the side edges.

In the automatic fabrication of these types of jackets it can, moreover, not be prevented that components of the fibrous web arrive between the sheet material near the provided bonding seam of the separator jackets which prevents the trouble-free production of the bonding seam because, as a rule, the web consists of a glass fiber web which cannot be bonded.

To avoid this disadvantage, it has been proposed to use polyester webs which can be unconditionally bonded and to apply the polyester web already before jacketing to the side of the sheet material facing the plates, for example, by bonding so that in the subsequent production step of the separator pockets only the sheet material with the web layer has to be wrapped around the plates and bonded at the side edges with the polyester web in between. The fabrication would be advantageously simplified, to be sure, since in the automatic process only the sheet material with the web layer must be handled, but practical application has shown that bonding of the sheet mateial with a polyester web layer is only conditionally possible and is less suitable for automatic mass production.

It is the objective of the invention to provide a useful solution for automatic mass production of lead accumulators while retaining the simplified fabrication process.

The solution of the invention provides the use of a sheet material with a web layer for the production of separator pockets in which the area extension of the web layer is smaller than the inside area of the sheet material defined by the provided bonding seams of the separator pocket.

The sheet material layered in this way is excellent for the automatic production of the separator pockets since the bonding seam of the pockets is now essentially free from the web. This measure per se is surprisingly simple, but in spite of its considerable advantages in the automatic production, has not been recognized thus far by those skilled in the trade.

A decisive advantage is obtained by the optimization of the properties of the web with respect to the improvement of the cycle strength of the plates since the bondability of the web does not have to be considered any longer.

This has provided the possibility for a further improvement, based on the objective of not only providing an improvement of the cycle strength by optimizing the web, but also a better utilization of the positive mass.

This objective is met according to claim 2 in that the web layer of the sheet material, in other words, the web covering of the positive plates consists of an electrically conductive material having an area extension which is smaller than the inside area of the sheet material resp. the separator pocket defined by the bonding seams of the separator pocket.

As a result of the condutive web covering, the positive mass can be much better utilized and over its entire area extension without the problem that a short-circuit in the lead accumulator may occur as a result of the conductivity of the web layer since the proposed offset of the web layer in relation to the provided bonding seam guarantees a trouble-free bonding of the seam even in industrial mass production of these type accumulators.

DESCRIPTION OF THE DRAWING

An exemplified embodiment of the invention is described below by means of the drawing:

The FIGURE shows in perspective a sheet material, which can be bonded, with a web layer according to the invention.

DESCRIPTION OF THE INVENTION

Figure 1:
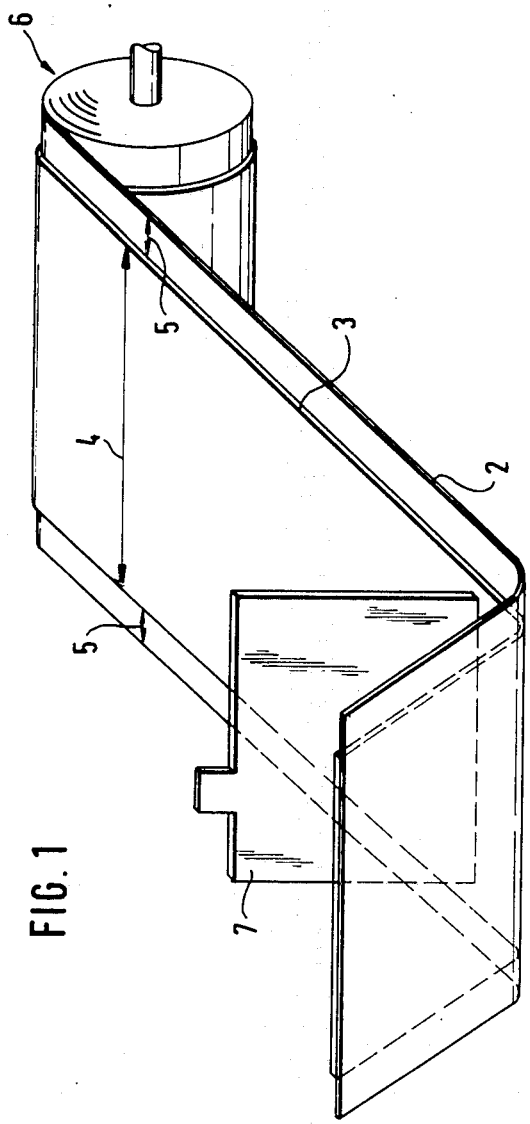

A thin flexible sheet material 2, which can be bonded, normally used for the production of separator pockets is shown. A web layer 3 has been applied to the sheet material in such a way that the area extension 4 of the web layer is smaller than the inside area of the sheet material defined by the bonding seams provided in the edge zones 5.

In automatic fabrication, the sheet material is supplied from a roll 6 and wrapped around a plate 7 as shown in the FIGURE. The wrapped sheet material is then cut to length and bonded at the edges 5 with the inserted plate 7 so that the fabrication results in a jacketed plate provided with a web covering.

What is claimed is:

1. In a jacketed battery plate for a lead-acid battery of the type including a battery plate and a separator jacket on said battery plate, wherein said jacket comprises a thin flexible sheet material and a layer of a flexible web material bonded to said sheet material, said sheet material and said web material being folded around an edge of said battery plate and being bonded together to form said jacket so that it contains said battery plate, the improvement comprising the width of said sheet material being greater than the width of said web layer, said web material being oriented with respect to said sheet material to define bonding areas along the opposite side edges of said sheet material which extend beyond said web material, said bonding areas being bonded together to form said jacket.

2. In the jacketed battery plate of claim 1, said sheet material further characterized as being a heat sealable material and being heat sealed together in said bonding areas.

3. In the jacketed battery plate of claim 1, said web layer further characterized as being electrically conductive.

4. In the jacketed battery plate of claim 1, said sheet material further characterized as a plastic sheet material.

* * * * *